US010857886B2

(12) United States Patent
Recktenwald et al.

(10) Patent No.: US 10,857,886 B2
(45) Date of Patent: Dec. 8, 2020

(54) RESPONSIVE HUMAN MACHINE INTERFACE (71) Applicant: BENTLEY MOTORS LIMITED, Crewe (GB)

(72) Inventors: Benedict Recktenwald, Wilmslow (GB); Richard Stevens, Windermere (GB)

(73) Assignee: Bentley Motors Limited, Crewe (GB)

( * ) Notice: Subject to any disclaimer, the term of this patent is extended or adjusted under 35 U.S.C. 154(b) by 278 days.

(21) Appl. No.: 15/774,218

(22) PCT Filed: Nov. 29, 2016

(86) PCT No.: PCT/GB2016/053740
§ 371 (c)(1),
(2) Date: May 7, 2018

(87) PCT Pub. No.: WO2017/093716
PCT Pub. Date: Jun. 8, 2017

(65) Prior Publication Data
US 2018/0326850 A1    Nov. 15, 2018

(30) Foreign Application Priority Data

Dec. 3, 2015    (GB) .................................. 1521360.6

(51) Int. Cl.
B60K 37/06    (2006.01)
B60K 37/02    (2006.01)
(52) U.S. Cl.
CPC .............. B60K 37/06 (2013.01); B60K 37/02 (2013.01); B60K 2370/1442 (2019.05);
(Continued)

(58) Field of Classification Search
CPC ...... B60K 2350/1032; B60K 2350/906; B60K 2350/106; B60K 2350/962; B60K 37/06;
(Continued)

(56) References Cited

U.S. PATENT DOCUMENTS 9,064,101 B2 *  6/2015  Kleve ..................... G06F 21/31
9,205,844 B2 * 12/2015  Yang .................... B60W 40/114
(Continued)

FOREIGN PATENT DOCUMENTS

DE    102011084887 A1    4/2013
GB          2454527 A  *  5/2009 ............. B60K 35/00
(Continued)

OTHER PUBLICATIONS

Krittiya et al., "Effects of Guided Arrows on Head-Up Display towards the Vehicle Windshield," 2012, Publisher: IEEE.*
(Continued)

Primary Examiner — Tuan C To
(74) Attorney, Agent, or Firm — Schwabe Williamson & Wyatt, P.C.

(57) ABSTRACT

The human machine interface (HMI) of a vehicle, especially an automobile is responsive to outside stimuli. Signals relevant to the amount of concentration required by a driver are received by the HMI, which determines, based on the values of these signals, a driver distraction level. As the driver distraction level increases, areas of a structured display on a display screen are dynamically removed, to present the driver with a reduced distractions when greater concentration is required.

21 Claims, 10 Drawing Sheets (52) U.S. Cl.
CPC ...... *B60K 2370/152* (2019.05); *B60K 2370/1868* (2019.05); *B60K 2370/195* (2019.05); *B60W 2540/22* (2013.01)

(58) Field of Classification Search
CPC ............. B60K 37/02; B60K 2370/195; B60K 2370/152; B60K 2370/1868; B60K 2370/1442; B60W 2540/22
USPC ........................................................ 701/36
See application file for complete search history.

(56) References Cited

U.S. PATENT DOCUMENTS

| | | | |
|---|---|---|---|
| 9,248,839 B1* | 2/2016 | Tan | B60W 50/08 |
| 9,308,914 B1* | 4/2016 | Sun | B60K 28/06 |
| 9,994,231 B2* | 6/2018 | Di Censo | B62D 1/06 |
| 10,011,156 B2* | 7/2018 | Lee | G08G 1/096725 |
| 10,216,468 B2* | 2/2019 | Cota Gonzalez | B60K 37/06 |
| 10,351,009 B2* | 7/2019 | Miller | B60W 10/06 |
| 10,503,343 B2* | 12/2019 | Lachenmann | G06F 3/0481 |
| 2003/0149545 A1* | 8/2003 | Shu | B60R 21/01542 |
| | | | 702/182 |
| 2003/0220725 A1* | 11/2003 | Harter, Jr. | B60K 35/00 |
| | | | 701/36 |
| 2006/0020429 A1* | 1/2006 | Brooks | G06F 30/30 |
| | | | 702/189 |
| 2007/0050191 A1* | 3/2007 | Weider | G10L 21/06 |
| | | | 704/275 |
| 2008/0133082 A1* | 6/2008 | Rasin | G01C 21/3688 |
| | | | 701/36 |
| 2009/0177355 A1* | 7/2009 | Chen | G01C 21/26 |
| | | | 701/36 |
| 2012/0051067 A1* | 3/2012 | Murray | G09F 13/22 |
| | | | 362/311.02 |
| 2012/0188186 A1* | 7/2012 | Autran | G06F 3/0416 |
| | | | 345/173 |
| 2012/0268294 A1* | 10/2012 | Michaelis | G06F 9/451 |
| | | | 340/905 |
| 2013/0002608 A1* | 1/2013 | Autran | G06F 3/041 |
| | | | 345/174 |
| 2013/0144486 A1* | 6/2013 | Ricci | B60K 37/00 |
| | | | 701/36 |
| 2013/0226399 A1* | 8/2013 | Miller | B60R 25/20 |
| | | | 701/36 |
| 2013/0338995 A1* | 12/2013 | Elkins | G06F 40/40 |
| | | | 704/2 |
| 2014/0002580 A1* | 1/2014 | Bear | G06F 3/012 |
| | | | 348/14.07 |
| 2014/0055382 A1* | 2/2014 | Kwon | G06F 3/041 |
| | | | 345/173 |
| 2014/0309861 A1* | 10/2014 | Lind | B60R 16/037 |
| | | | 701/36 |
| 2015/0286340 A1* | 10/2015 | Send | G01J 1/0437 |
| | | | 345/175 |
| 2015/0360564 A1* | 12/2015 | Kalbus | H04W 4/48 |
| | | | 701/36 |
| 2016/0016473 A1* | 1/2016 | Van Wiemeersch | |
| | | | G01G 19/4142 |
| | | | 701/36 |
| 2017/0232897 A1* | 8/2017 | Itoh | B60R 21/00 |
| | | | 348/148 |

FOREIGN PATENT DOCUMENTS

| | | | | |
|---|---|---|---|---|
| GB | 2491013 A | | 11/2012 | |
| GB | 2508690 A | * | 6/2014 | .......... B60W 50/087 |
| JP | 2004226367 A | * | 8/2004 | |
| JP | 3819342 B2 | * | 9/2006 | |
| JP | 2015022766 A | * | 2/2015 | .......... G06F 3/0488 |
| KR | 20080028527 A | * | 4/2008 | |
| WO | WO-2013179390 A1 | * | 12/2013 | ............ G06F 3/048 |
| WO | WO-2014057309 A1 | * | 4/2014 | ............ B60W 40/09 |
| WO | WO2014137554 A1 | | 9/2014 | |
| WO | WO2015008290 A2 | | 1/2015 | |

OTHER PUBLICATIONS

Carl et al., "A Review of Automotive Human Machine Interface Technologies and Techniques to Reduce Driver Distraction," 2007, Publisher: IET.*

* cited by examiner

RESPONSIVE HUMAN MACHINE INTERFACE

CROSS REFERENCE TO RELATED APPLICATIONS

The present application is a national phase entry under 35 U.S.C. § 371 of International Application No. PCT/GB2016/053740, filed Nov. 29, 2016, entitled "RESPONSIVE HUMAN MACHINE INTERFACE," which designated, among the various States, the United States of America, and which claims priority to GB 1521360.6 filed Dec. 3, 2015, both of which are hereby incorporated by reference.

TECHNICAL FIELD OF THE INVENTION

The present invention relates to the human machine interface (HMI) of a vehicle, especially, but not exclusively, an automobile. In particular the invention relates to a HMI which is responsive to outside stimuli.

BACKGROUND TO THE INVENTION

It is now common for automobiles, and other vehicles, to have display screens through which a user interacts with the vehicle. Such display screens are navigable by way of various inputs, such as touch-screens, buttons, knobs, gestures or voice. Depending on the mode chosen, such screens may display different information, for example in relation to satellite navigation, video displays from cameras located about the vehicle, cell-phone use, movies, radio stations, climate control and so on. Without limitation, speed, RPM and other information may also be displayed on such screens. Usually such display screens are integral to the vehicle, but a display screen may be part of a portable mobile device, such as a phone or tablet, which is suitably connected to the vehicle such that inputs to the portable device control the vehicle and signals from the vehicle are transmitted to the portable device.

Some of these outputs and icons for potential inputs can create a distraction to a driver and naturally, when inputting information into the HMI, a driver's attention to the road is reduced. Accordingly, certain vehicles disable certain inputs in response to the state of the vehicle. In particular, it is common for satellite navigation systems to disable the option of entering a new destination when the vehicle is in motion (e.g. above 7 kph). This is normally done by "greying out" the input icon on the screen, to a slightly lighter colour than the other options, or when the icon is selected, failing to respond, or displaying a message that the icon cannot be selected when the vehicle is in motion.

Similarly, when an automobile is in motion, the movie/TV option is often disabled in the same fashion, i.e. it is "greyed out", or when selected fails to respond or displays a message.

An object of embodiments of the invention is to provide an improved HMI.

SUMMARY OF THE INVENTION

According to a first aspect of the present invention, there is provided a human machine interface (HMI) for a vehicle, the HMI comprising at least one display screen configured to simultaneously display a plurality of areas as a structured display; the human machine interface operable to determine a driver distraction level based on at least one signal received by the HMI and to remove predetermined areas from the structured display on the screen in response to an increase in the driver distraction level beyond a predetermined threshold.

Such a HMI is advantageous in that a user (whose distraction level is already determined to be beyond a certain level) will not be confused by the appearance of an area, e.g. a greyed out selectable area which cannot be selected, nor presented with a message which could further distract him/her as the amount of concentration required increases.

The areas may be removed dynamically from the structured display, for example such that they appear to move off the edge of the visible area, or become covered by other areas of the screen. This dynamic motion, which may be a smooth movement, has the effect of acclimatising the driver to the loss of information/options so that he/she will not attempt to find the option/information in the area once it is no longer visible. This further avoids potential distraction, when concentration is required.

As areas are removed from the structured display, the size of the remaining areas may be increased. The increase in size of remaining areas makes the screen easier to read and use for a driver whose distraction level is beyond a predetermined threshold.

One or more of the plurality of areas may be selectable areas. Selectable areas may be removed from the screen.

At least one of the plurality of areas may comprise an image of a navigation instruction The size of the area comprising the navigation instruction may increase in response to an increase in the driver distraction level.

The driver distraction level may correspond to the speed of travel of the vehicle only.

The driver distraction level may be calculated based on factors instead of, or in addition to, the speed of the vehicle.

The driver distraction level may be calculated based on signals indicative of one or more of the following factors: speed, driver drowsiness, road condition, traffic conditions, such as traffic jams, navigation data, such as road curvature, upcoming signals, intersections, stops signs, upcoming manoeuvres, status of Autonomous Cruise Control (ACC), status of Automatic Emergency Braking system (AEB), status of automatic Lane Keeping System (LKS), and/or Lane Departure Warning system (LDW), telephone status (e.g. on/off/active call), radio/video status and/or volume.

Additional factors, such as the state of driving controls, for example, a gear lever or hand brake, may be used, and each factor may be weighted. For example, with the gear lever in neutral and the hand brake activated, the weighting may be such that the driver distraction level is set to zero regardless of factors such as driver drowsiness, road condition, traffic conditions, navigation data, upcoming maneuvers or the status of the various safety systems (on the basis that with the gears not engaged and the handbrake on, the car is not being driven).

Speed can be determined from signals provided to the speedometer; driver drowsiness can be determined by known means, such as disclosed in EP0999520; road condition, e.g. wetness can be determined from sensors, such as are used in automatic windscreen wiper systems, or based on determining the windscreen wiper speed; traffic conditions, navigation data and upcoming maneuvers can all be determined from data obtained by a satellite navigation system. The status of the various safety systems can be determined from the vehicle's central computer, or Engine Control Unit (ECU).

Driver distraction level can be calculated by assigning a value based on the level of one or more of the factors and applying a weighting to the factor.

In one particular embodiment of the invention, a human machine interface for a vehicle comprises a display screen configured to simultaneously display a plurality of areas and is operable to determine driver distraction level based on at least one signal received by the human machine interface and to dynamically remove areas from the screen in response to an increase in the driver distraction level; wherein the signal indicative of driver distraction level is indicative of the speed of the vehicle and the distance until the next navigation manoeuvre; the display screen being configured to simultaneously display an area comprising image of navigation instructions, an area comprising an image of a map and one or more selectable areas, wherein the human machine interface is operable such that as speed increases and as the distance until the next manoeuvre decreases past a first predetermined threshold, the display screen is operable to remove one or more selectable areas from the structured display on the screen, then as a second predetermined threshold is passed, the human machine interface is operable to increase the size of the area comprising navigation instructions, then as a third predetermined threshold is passed, the human machine interface is operable to remove the area comprising the image of the map from the screen such that only the image comprising a navigation instruction remains and its size is significantly increased.

The image of the map may only be removed completely above a certain predetermined threshold speed, e.g. at least 200 kph, or even at least 300 kph and within a certain predetermined distance to the next navigation manoeuvre, e.g. less than 1 km.

This is because generally speaking, drivers will have sufficient time to note navigation instructions and the addition of a map will assist in taking the correct turning. However, in high-speed driving, such as may be conducted in high-powered automobiles on roads without speed restriction it is critical to present as few distractions as possible to the driver as a navigation manoeuvre, e.g. taking an exit from the motorway, approaches.

The dynamic removal of images from the screen may be such that the image appears to move off the visible area of the screen.

In one particular embodiment, as speed gradually increases, so predetermined areas may gradually recede from the screen, for example, either fading away, or moving off the visible area of the screen.

Predetermined areas may be selectable areas and may gradually recede from the screen until at a certain predetermined speed they are no longer selectable.

Once certain first predetermined selectable areas have receded and are no longer selectable, second predetermined areas may recede (e.g. fading or moving off the visible area of the screen), until the speed reaches a second predetermined speed, at which the second predetermined areas are no longer selectable either.

Once the second predetermined selectable areas are on longer selectable, one or more third predetermined area may recede, until at a certain predetermined speed, only a predetermined minimum level of information is provided on the screen.

The extent to which the areas recede may be directly proportional to the speed of the vehicle, receding gently as speed increases gently, or faster if speed increases faster.

The areas may also return to the screen in the same fashion as speed reduces, gradually appearing, and becoming selectable at the same predetermined threshold speed at which they stopped being selectable.

In a particularly preferred embodiment, the selectable areas gradually move off the visible area of the screen and begin to fade at the moment that they are no longer selectable. Alternatively, the selectable areas may gradually fade and begin to move of the screen at the point that they are no longer selectable.

According to a second aspect of the invention there is provided a method of controlling a human machine interface (HMI) in an automobile; the method comprising: receiving at least one signal relating to a factor relevant to the amount of concentration required of a driver; calculating a driver distraction level based on the at least one signal; determining whether the driver distraction level is above a predetermined threshold; and if the driver distraction level is determined to exceed a predetermined threshold, controlling the display screen so as to dynamically remove predetermined areas from the structured display on the display screen.

Receiving at least one signal relevant to the concentration required of a driver may comprise receiving a plurality of signals relevant to the amount of concentration required.

The signals relevant to the concentration required may be signals indicative of one or more of the following factors: speed, driver drowsiness, road condition, traffic conditions, navigation data, upcoming maneuvers, status of Autonomous Cruise Control (ACC), status of Automatic Emergency Braking system (AEB), status of automatic Lane Keeping System (LKS), and/or Lane Departure Warning system (LDW), status of a Traffic Pilot, or Auto Pilot, telephone status (e.g. on/off/active call), radio/video status and/or volume.

Calculating the distraction level may comprise applying a weighting to the different signals received, in order to determine a total driver distraction level.

A plurality of thresholds may be provided and as each threshold is exceeded a greater number of predetermined areas may be dynamically removed from the structured display.

The method may include any of the features set out above in relation to the first aspect of the invention.

The present invention also extends to an automobile comprising a HMI as set out in the first aspect (including optional features) and an automobile adapted to carry out the method of the second aspect (including optional features).

DETAILED DESCRIPTION OF THE INVENTION

In order that the invention may be more clearly understood embodiments thereof will now be described, by way of example only, with reference to the accompanying drawings, of which.

Figure 1:
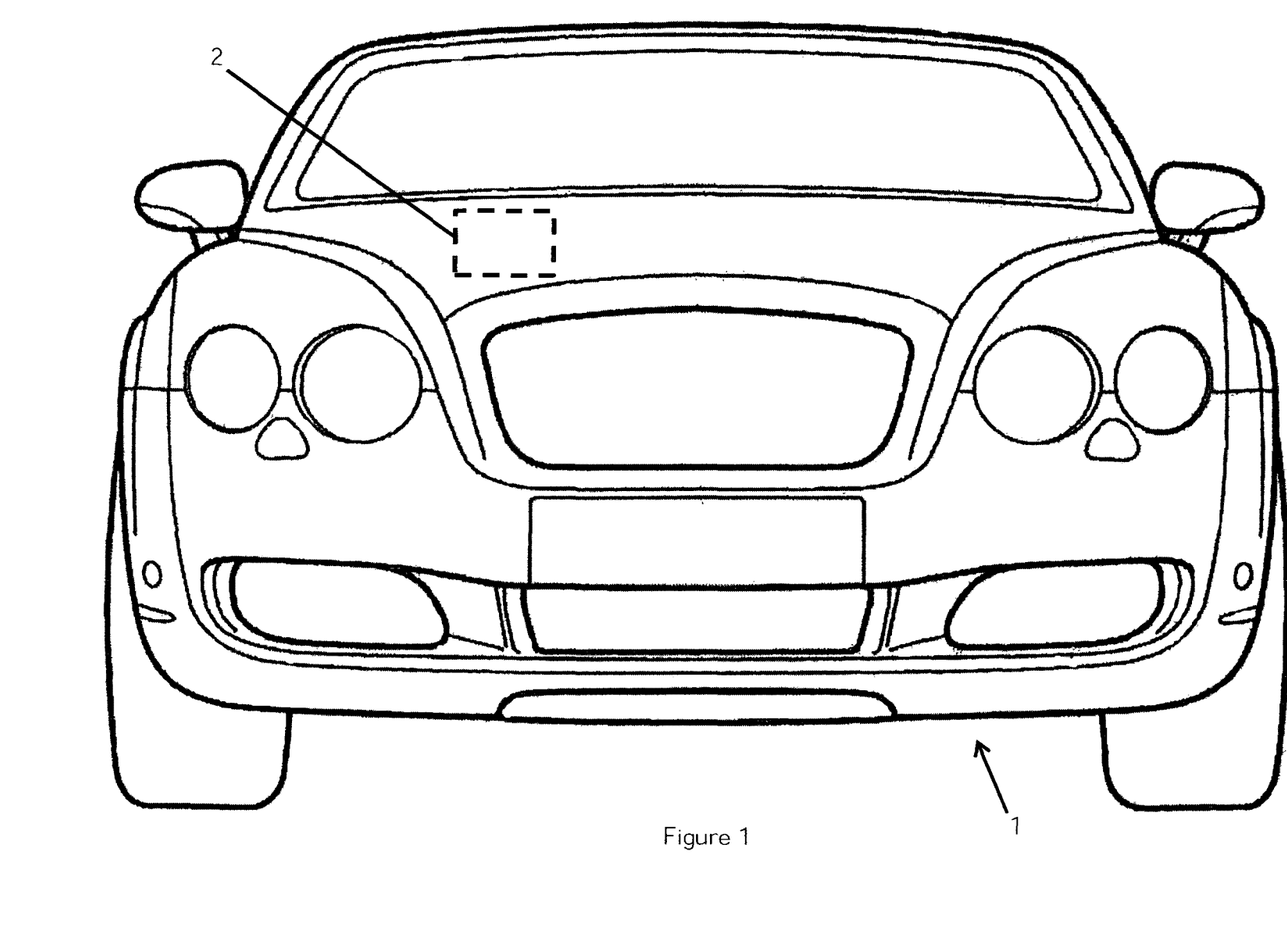
FIG. 1 shows an automobile incorporating a Human Machine Interface (HMI) according to the invention.
Figure 2:
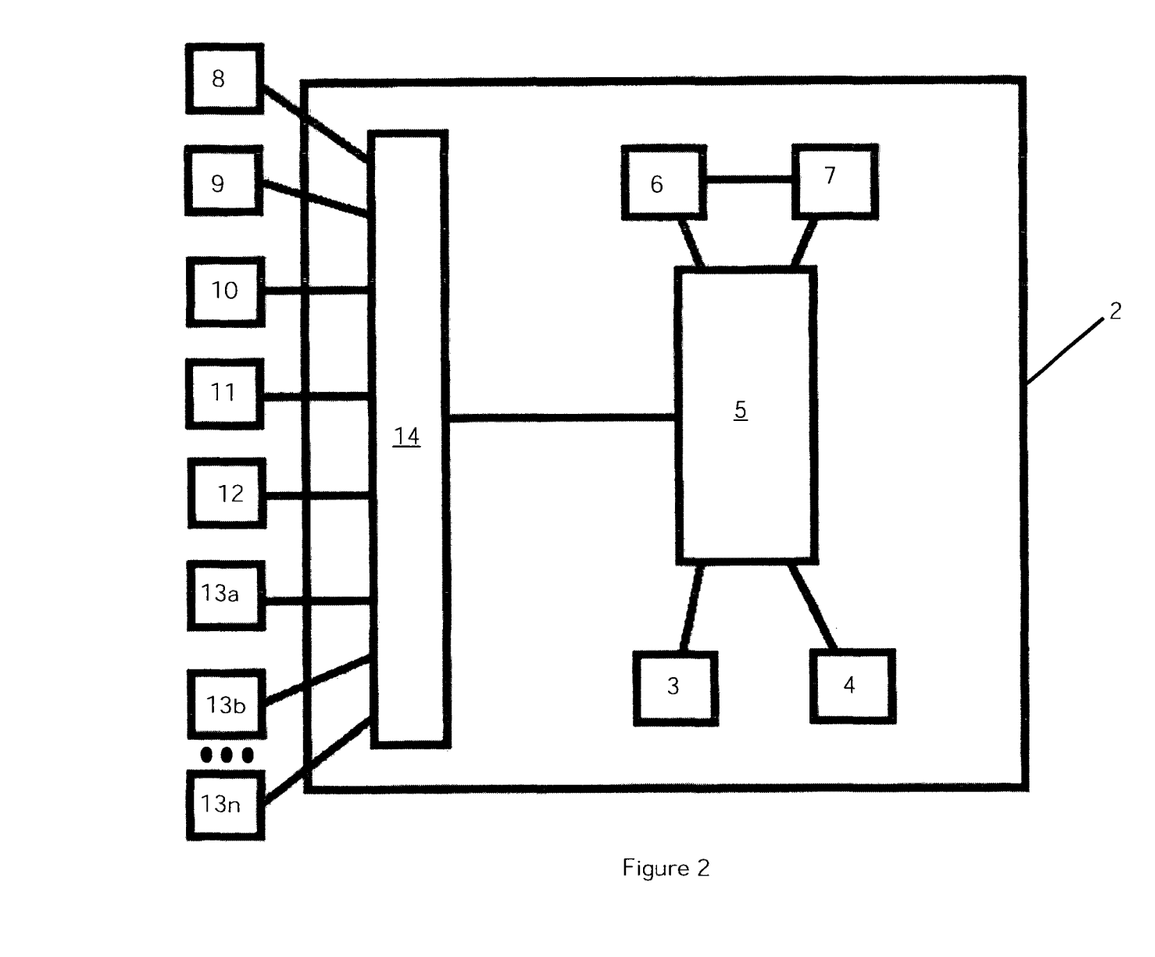
FIG. 2 shows schematically the HMI of FIG. 1 and its connections to apparatus in the automobile.

Referring to FIG. 1, an automobile 1 comprises a Human Machine Interface 2 shown in more detail in FIG. 2. The HMI 2 comprises a display screen 3 mounted in interior of the automobile 1 so as to be visible to a driver, a user actuable input device 4, such as a rotary controller, or touch sensitive screen covering the display screen 3, a processor 5 which receives input signals from the input device 4 and outputs display signals to the display screen 3. The HMI 2 also comprises memory 6, which the processor may read from and store to and a distraction level determination module 7, which is also able to read data from, and store data to, the memory 6.

The processor 5 is also able to receive and process signals from outside the HMI 2, which are received by a communications unit 14. In particular, the processor 5 is arranged to receive, from the communications unit 14 signals from a satellite navigation module 8, a vehicle speed sensor 9, a driver drowsiness estimating apparatus 10, a road condition sensor 11 (e.g. a sensor or combination of sensors arranged to measure wetness and temperature), and from the automobile's ECU 12.

Those skilled in the art will appreciate that the processor 5 need not receive all of these signals directly from the apparatuses 8, 9, 10, 11, 12 defined, for example, the ECU alone may provide signals indicative of the vehicle's speed, or road conditions, indeed, an indicative speed could even be included in the signal from the satellite navigation module 8. It will also be appreciated that receiving modules (not shown) etc. may be introduced to interface with the various external apparatuses 8-12 to receive and optionally format the signals before they are passed to the communications unit 14.

The processor 5 is arranged to request and subsequently process signals received from the various external apparatuses 8-12 and send them to the distraction level determination module 7 and in response to the distraction level determined by the distraction level module 7 and the input from the input device 4, to output a display to the display device.

Of course, the processor 5 is also responsible for processing and forwarding commands from the input device 4 to further external hardware 13 such as radio or climate control devices etc., via the communications unit 14 in the HMI 2 (which will also feed back signals to the processor concerning the devices it controls), and optionally via the automobile's ECU 12.

According to the method of an embodiment of the invention, the processor 5 receives input signals from the external apparatus 8-12 and the internal control unit 14 as set out in table 1 below:

TABLE 1

| | |
|---|---|
| Satellite navigation module 8 | Traffic conditions |
| | Navigation data |
| | Upcoming manoeuvres |
| Speed sensor 9 | Vehicle speed |
| Drowsiness estimating apparatus 10 | Driver drowsiness level |
| Road condition sensor 11 | Road condition |
| ECU 12 | Autonomous Cruise Control (ACC) status |
| | Automatic Emergency Braking system |

TABLE 1-continued

| | |
|---|---|
| | (AEB) status |
| | Automatic Lane Keeping System (LKS) status |
| | Lane Departure Warning system (LDW) status |
| | Traffic Pilot status |
| | Auto Pilot status |
| HMI Control Unit 14 | Telephone status (e.g. on/off/active call) |
| | Radio status |
| | Video status |
| | Volume |

It will be appreciated that the signals may be provided by other devices in the vehicle, for example, the satellite navigation module may be able to provide information on the status of the radio, and the ECU or instrument cluster may provide speed information.

The signals are processed and sent to the distraction level determination module 7, which determines based on the value of these signals, the distraction level.

Of course various methods may be used to weight the different results, to conditionally take certain values into account and so on, and such methods may be optimised with improved algorithms, but as an exemplary specific embodiment, distraction level determination module 7 determines the distraction level by assigning weighted values to the results of the input signals as shown in table 2 below:

TABLE 2

| | |
|---|---|
| Traffic conditions | Clear = 0 |
| | Moderate = 5 |
| | Busy = 10 |
| Navigation data | Straight road = 0 |
| | Moderate curves = 5 |
| | Very curvy = 10 |
| Upcoming manoeuvres | None within 2 minutes = 0 |
| | Easy manoeuvre within 2 minutes = 1 |
| | Easy manoeuvre within 30 seconds = 5 |
| | Complex manoeuvre within 2 minutes = 5 |
| | Complex manoeuvre within 30 seconds = 10 |
| Vehicle speed | 0 Kph = −1000 |
| | 0-20 kph = 0 |
| | 20-50 kph = 5 |
| | 50-90 kph = 10 |
| | 90-130 kph = 20 |
| | 130-200 kph = 50 |
| | 200-300 kph = 90 |
| | 300+ kph = 1000 |
| Driver drowsiness level | Fully awake = 0 |
| | Moderately drowsy = 10 |
| | Drowsy = 30 |
| Road condition | Dry = 0 |
| | Wet = 5 |
| | Foggy = 30 |
| | Potentially Icy = 30 |
| Autonomous Cruise Control (ACC) status | On = 0 |
| | Off = 5 |
| Automatic Emergency Braking system (AEB) status | On = −5 |
| | Off = 5 |
| Automatic Lane Keeping System (LKS) status | On = −10 |
| | Off = 5 |
| Lane Departure Warning system (LDW) status | On = −5 |
| | Off = 2 |
| Time of day | day = 0 |
| | Dawn/dusk = 10 |
| | Night = 10 |
| Telephone status (e.g. off/active call/incoming call/interaction with device) | Off = 0 |
| | Active call = 10 |
| | Incoming call = 20 |
| | Interaction = 30 |
| Radio status | Inactive = 0 |
| | Channel browsing = 30 |
| Video status | Off = 0 |

TABLE 2-continued

| | |
|---|---|
| Volume | On = 20 |
| | Off = 0 |
| | Quiet = 2 |
| | Loud = 10 |

Once a value has been assigned to each factor, the distraction level determination module 7 sums the weighted values to produce a total distraction level, which is output to the processor to determine which images should be displayed on the screen and which to dynamically remove. This distraction level is constantly updated as new signals are received.

The value assigned to the distraction level, based on this is used to determine which images are shown on the display screen 3. Thus the memory 6 stores information concerning which images to display on the display screen 3 dependent on the value of the distraction level. In one example, the memory 3 indicates that that the display screen 3 should be fully operational, with all the selectable images displayed, provided the distraction level is 0 or lower. Hence, when the vehicle is stationary, because the value of −1000 is assigned to the speed, regardless of the value of any other signals, because the speed=0, the value of the distraction level will be below 0 and therefore the display screen 3 will be fully operational, with all selectable items shown on the display screen 3.

Figure 3:
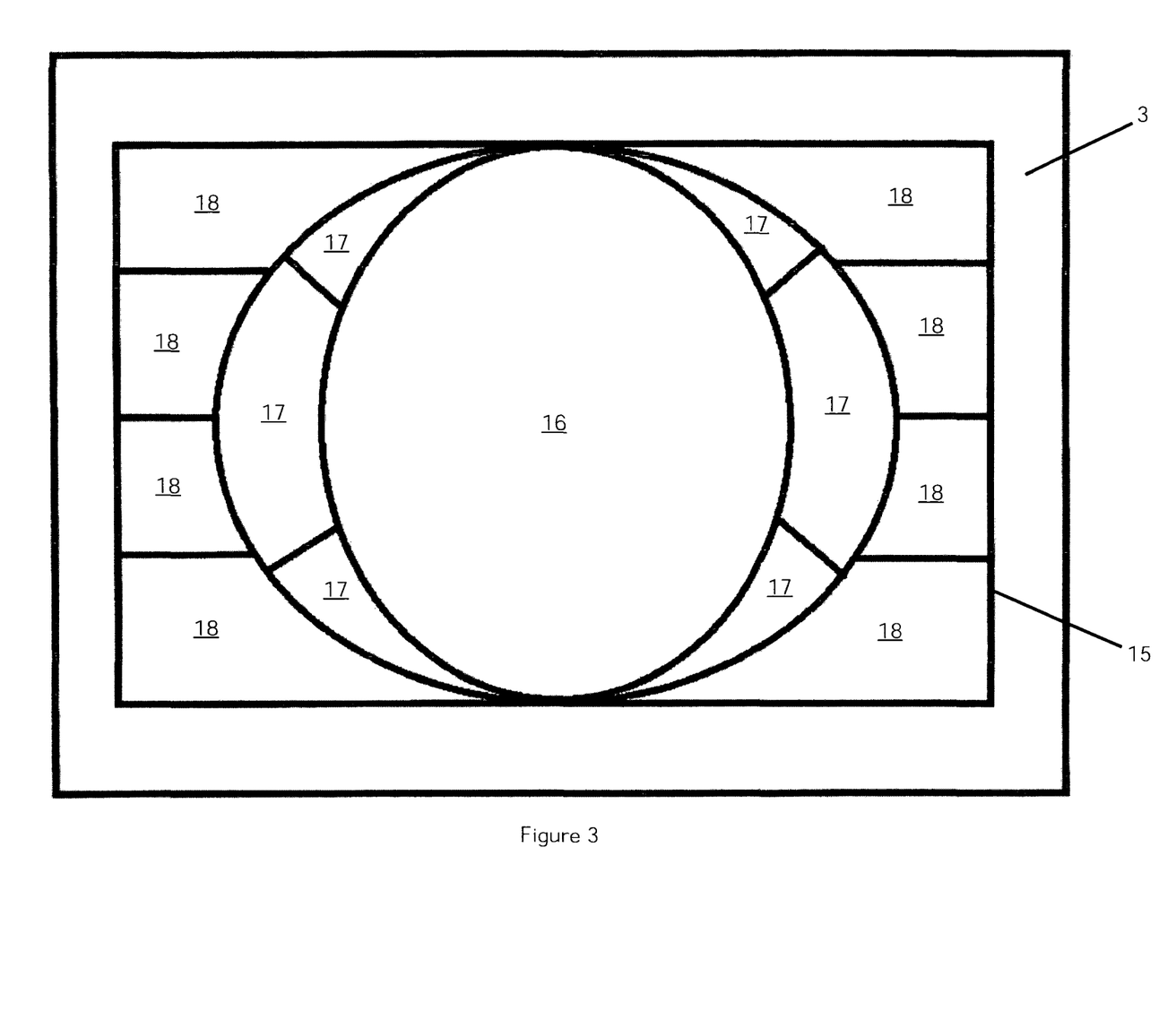
FIG. 3 shows a first embodiment of an arrangement of images on the display screen of the HMI of FIG. 1 in one configuration.

A first exemplary embodiment of a possible structured display, in which particular areas displaying particular information are arranged in particular places on a display screen 3, in accordance with the invention is described with reference to FIGS. 3-5. As shown in FIG. 3, the structured display on the display screen 3, when fully operational (e.g. when speed=0) comprises a rectangular display area 15, on which a circular information display area 16 is centrally disposed. Information, for example in relation to the mode currently chosen, e.g. radio, climate control, navigation system etc. is displayed in the information display area 16. To either side of the information display area 16, three low-distraction selectable areas 17 are situated, in a region which defines an oval around the circular central section. These low-distraction selectable areas 17 (six in total) are for selecting items which do not require a great deal of attention, for example, volume control, or temperature control. Outside the oval region, extending to the edges of the visible area of the display screen 3, the area on each side of the oval is divided into four high-distraction selectable areas 18 (eight in total). These high-distraction selectable areas 18 are for selecting items which may require significant concentration from the driver, for example inputting a destination to a satellite navigation system, making a telephone call, watching a video or altering the settings of the automobile 1.

In the example, the memory 6 stores a reference table indicating that where the distraction level is between 1 and 20, the high distraction selectable areas 18 should be removed from the screen, but the low distraction selectable areas 17 may remain.

Thus, for example, when the traffic conditions are clear (=0), the road is straight (=0), there are no upcoming maneuvers (=0), the vehicle is being driven at 40 kph (=5), by a driver who the apparatus 10 determines to be moderately drowsy (=10) on a road which the road condition sensor 11 indicates to be dry (=0), with the signal from the ECU 21 indicating that all the driver assistance systems (ACC, AEB, LKS, are turned on (=−15), and with the telephone status being off with no active call (=0), the radio inactive (=0) with volume at a relatively low level (=2) and the video off (=2), the distraction level determination module 7 will determine a distraction level of 5, the total of the values for each factor that is being monitored and will output that value to the processor 5, the processor 5 will determine based on a comparison with the reference table stored in the memory 6 that the value has passed the predetermined threshold of 1, at which the high distraction selectable areas 18 should be removed from the screen and will dynamically remove the high distraction selectable areas 18 from the screen.

Figure 4:
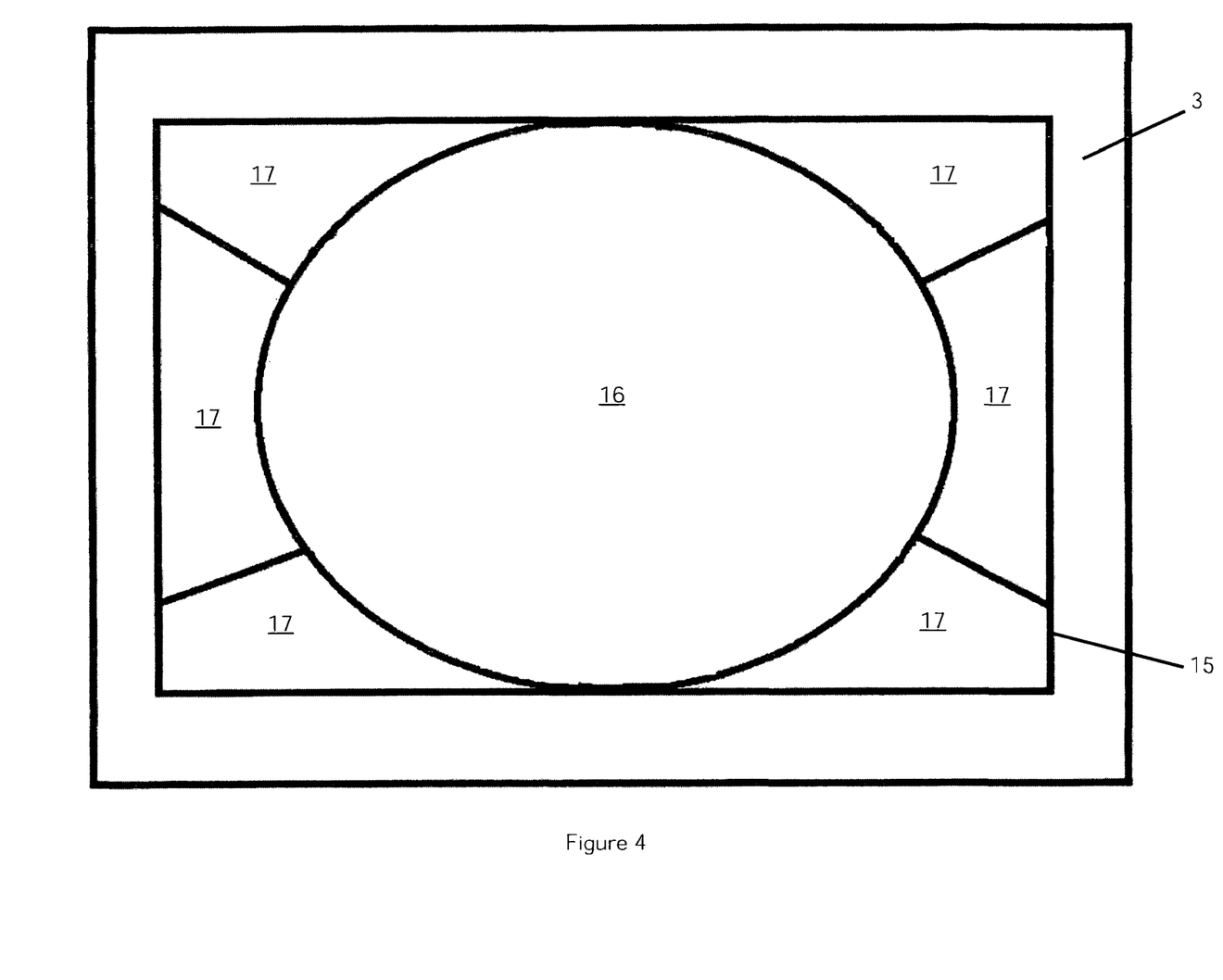
FIG. 4 shows the display screen of the HMI of FIG. 3 in another configuration.

This is done by altering the display signal sent from the processor 5 to the display screen 3, so as to show the central information display image 16 expanding laterally, to occupy an oval shaped central region as shown in FIG. 4, simultaneously, the outer high-distraction selectable areas 18 are deleted from the screen (a dynamic display can for example show them shrinking towards the edges of the visible area of the rectangular display area 15), and the six low-distraction selectable areas 17 are then displayed occupying six sectors (three either side of the oval central information display image 16).

The processor 5 continuously, or periodically, sends updated signals to the distraction level determination module 7, to update the value of the distraction level and, if the level passes the second threshold of 20 and enters a second region stored in the reference table in the memory, of between 20 and 100, the display signal sent by the processor 5 is again modified to alter the image shown on the display screen 3.

Thus, for example, if the traffic conditions remain clear (=0), there are no upcoming manoeuvres (=0), the vehicle is being driven by a driver who the apparatus 10 determines to be moderately drowsy (=10) on a road which the road condition sensor 11 indicates to be dry (=0), with the signal from the ECU 21 indicating that all the driver assistance systems (ACC, AEB, LKS,) are turned on (=−15), (note that LKS and LDW are mutually exclusive) and with the telephone status being active call (=10), the radio inactive (=0) with volume at a relatively low level (=2) and the video off (=2), but the speed sensor determines that the speed is 140 kph (=30), the distraction level determination module 7 will determine a distraction level of 39, the total of the values for each factor that is being monitored.

Figure 5:
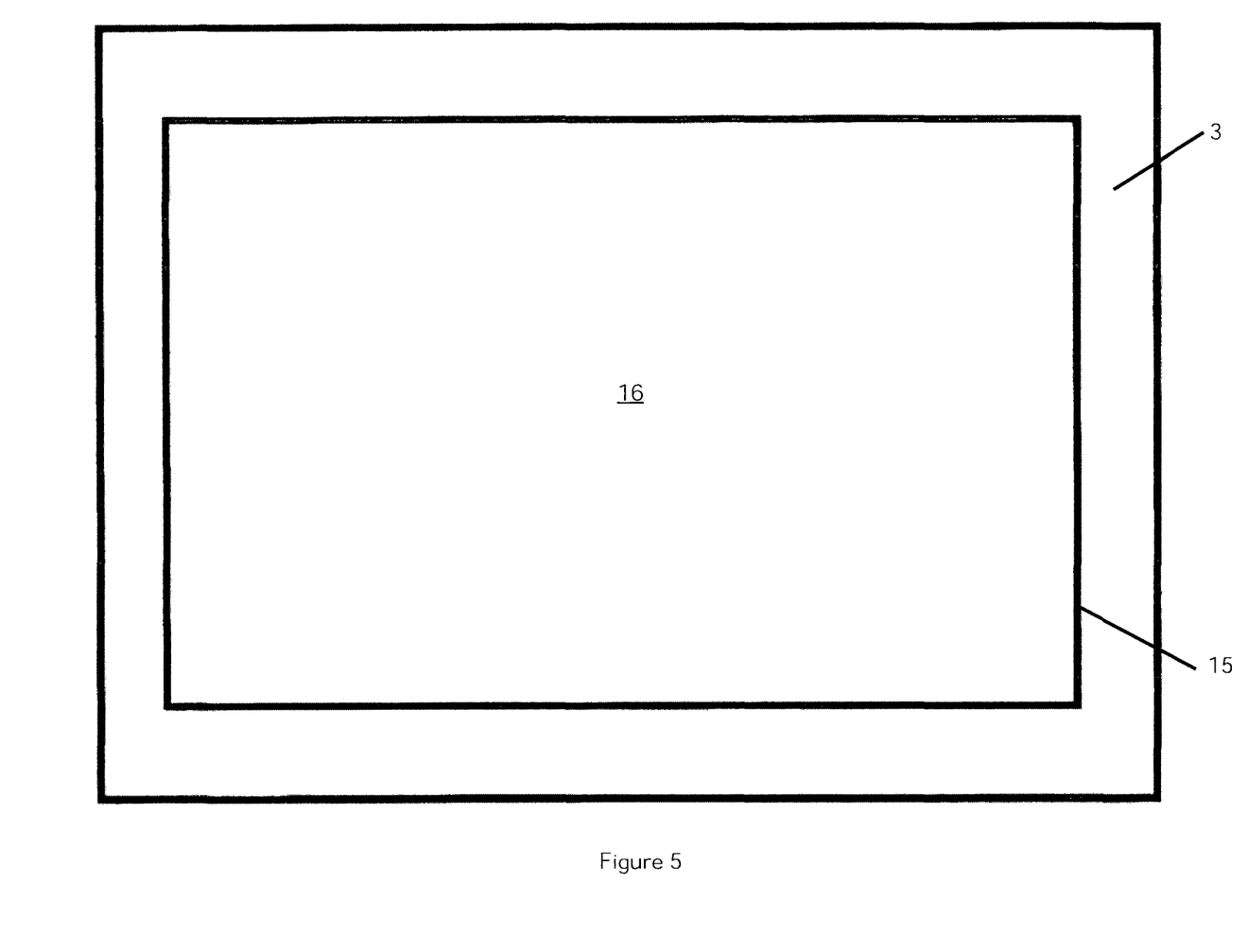
FIG. 5 shows the display screen of the HMI of FIG. 3 in a third configuration.

Accordingly the distraction level determination module 7 will output that value to the processor 5, the processor 5 will determine based on a comparison with the reference table stored in the memory 6 that the value has passed the second predetermined threshold of 20, at which the low distraction selectable areas 17 should be removed from the display screen 3 and will dynamically remove the low distraction selectable areas 17 from the screen 3 to display the image shown in FIG. 5, in which none of the selectable items are visible.

In a further step, if the continuous/periodic monitoring of the signals that determine the distraction level continue to increase and pass a third threshold of 100, to enter a third region stored in the memory of between 100 and 2000, the processor 5 sends a signal to the display screen 3 modifying the image to show only a very basic image e.g. the next manoeuvre if satellite navigation is active, or no image at all. At this stage, the processor may send additional signals to the control unit 14 or ECU 12 to shut down any further potential distractions.

As will be appreciated, in this example, this final, third threshold cannot be exceeded, since the highest possible value for the distraction level would be 1207 and the circumstances where that total would be reached are unrealistic, involving a speed in excess of 300 kph on a busy road with a rapidly approaching complex manoeuvre, potentially icy weather and whilst interacting with the telephone and radio. Of course, the final threshold of 100 will always be reached when travelling at very high speed (in excess of 300 kph) and can be relatively easily reached if travelling at over 200 kph with additional potential distractions.

Figure 6:
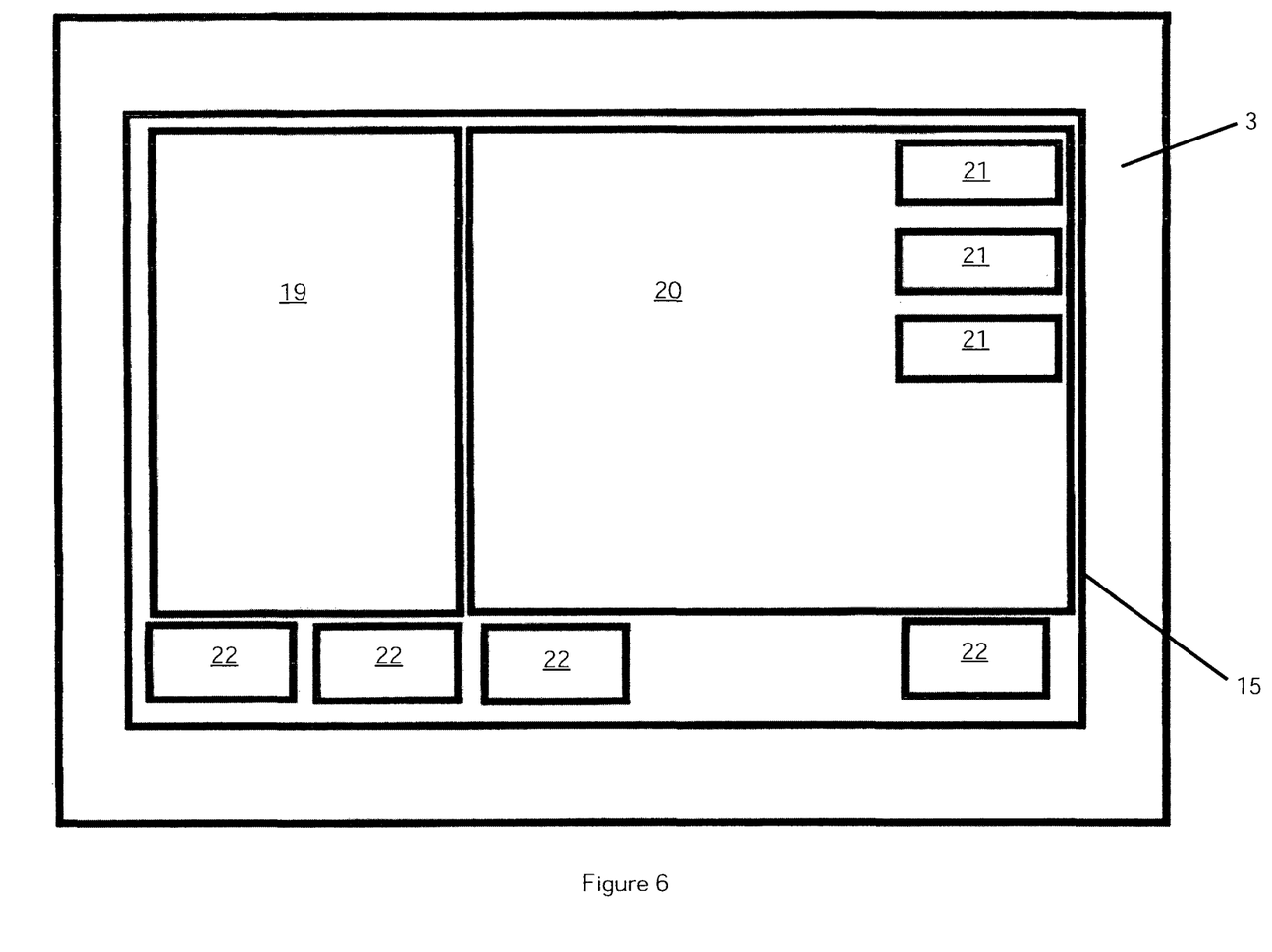
FIG. 6 shows a second embodiment of the arrangement of images on the display screen of the HMI of FIG. 1 in a first configuration.

A second exemplary embodiment of a structured arrangement of images on a display screen is shown with reference to FIGS. 6-9. This embodiment relates in particular to an arrangement including a satellite navigation system and in which the only factor taken into account in determining the distraction level is the speed of the vehicle. As shown in FIG. 6, the structured display on the display screen 3, when fully operational (e.g. when speed=0) comprises a rectangular display area 15, on which, in the satellite navigation mode about one third of the screen, in the top left, comprises a rectangular navigation instruction image 19. This is a simple display of the next manoeuvre required, e.g. an arrow, optionally also indicating the distance in which the manoeuvre will be necessary. To the right of the navigation instruction image 19, in this embodiment, occupying most of the remaining two thirds of the screen, is a map image 20, which, as is conventional, may show the position of the vehicle on a map. In the top right hand corner, three low-distraction selectable areas 21 are disposed, overlaying the map image 20. Again, these low-distraction selectable areas 21 (three in total) are for selecting items which do not require a great deal of attention. In this particular arrangement (which those skilled in the art will appreciate is just exemplary) four high-distraction selectable areas 22 are located along the bottom of the display area 15. Again, the high-distraction selectable areas 22 are for selecting items which may require significant concentration from the driver, for example inputting a destination to a satellite navigation system, making a telephone call etc.

Figure 10:
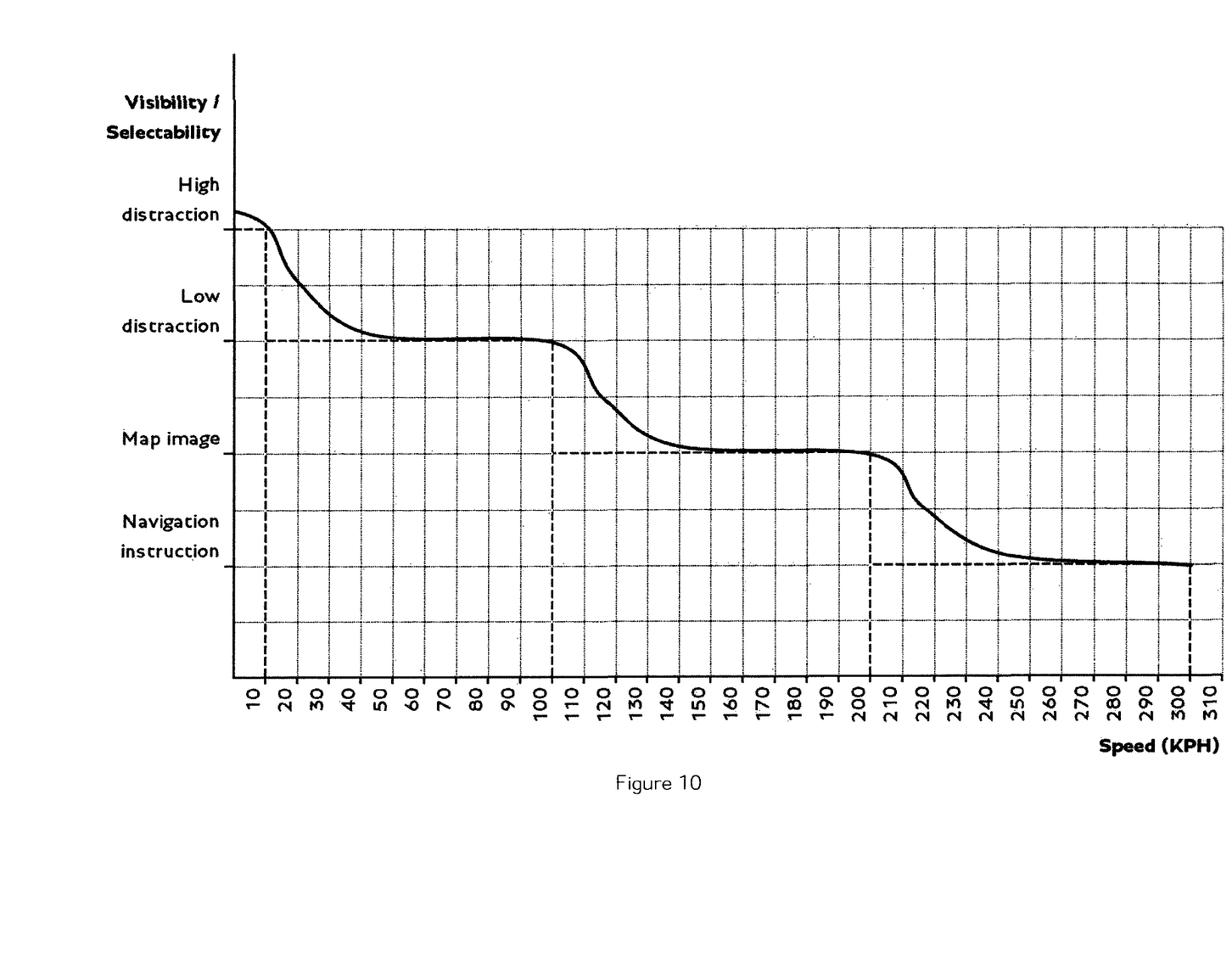
FIG. 10 shows a graph of visibility and selectability as a function of speed.

In the second example, the memory 6 stores a reference table which correlates speed with distraction level. Thus, as shown in FIG. 10, as speed increases visibility of certain areas, shown in the figure by the line graph reduces, and, as shown in the figure by the bar chart, selectability, i.e. the function of the areas when selected, similarly reduces as speed increases. Hence, at between 0 and 10 kph, all of the display areas, 19, 20, 21 and 22 are completely visible and selectable. However, when the speed reaches 10 kph, the high distraction selectable areas 22 are no longer selectable and as shown in the visibility line, they start to become less visible, being gradually be removed from the screen and fading away, whilst low distraction selectable areas 21, map image 20 and navigation instruction image remain entirely visible.

Thus, as speed is output to the processor 5, the processor 5 will determine based on a comparison with the reference table stored in the memory 6 that the value has passed the predetermined threshold of 10 kph, at which the high distraction selectable areas 22 should no longer be selectable and should be removed from the screen and will dynamically remove the high distraction selectable areas 22 from the screen, in response to further increase in speed, by outputting an image signal which causes the high distraction selectable areas 22 to appear to fade and move downwards off the visible area 15 of the screen 3 as speed increases.

Figure 7:
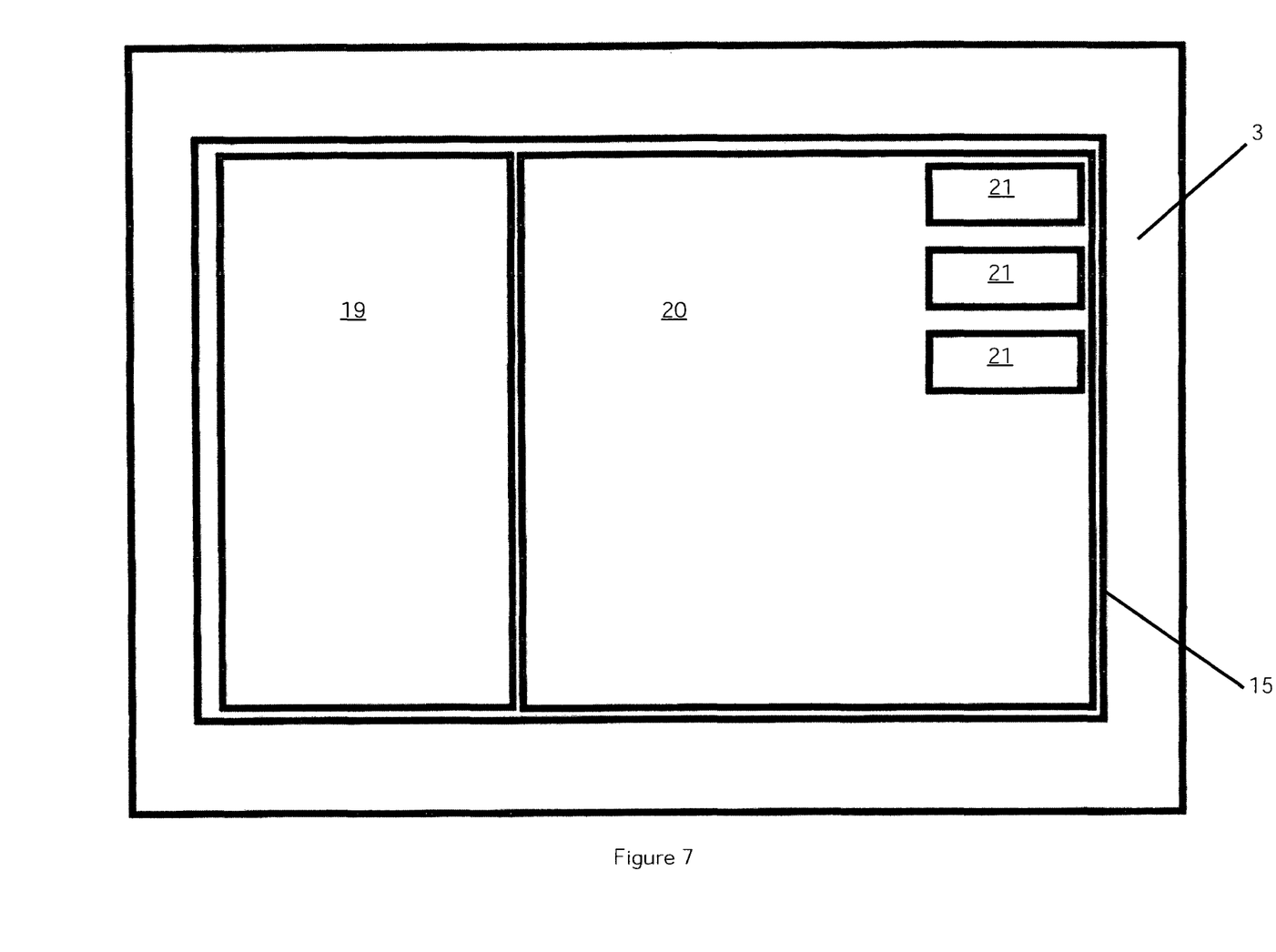
FIG. 7 shows the display screen of the HMI of FIG. 6 in a second configuration.

At the same time, with increasing speed, as shown in FIG. 7, the length of the navigation information area 19 and the map image 20 expand downwardly, to occupy the space where the high-distraction selectable areas 22 were formerly disposed.

The processor 5 continuously sends updated signals to the distraction level determination module 7, to update the value of the distraction level (i.e. in this example the speed) and, if the level passes the second threshold of 100 kph and enters a second region stored in the reference table in the memory, of between 100 kph and 200 kph, in which the display signal sent by the processor 5 is again modified to alter the image shown on the display screen 3.

Figure 8:
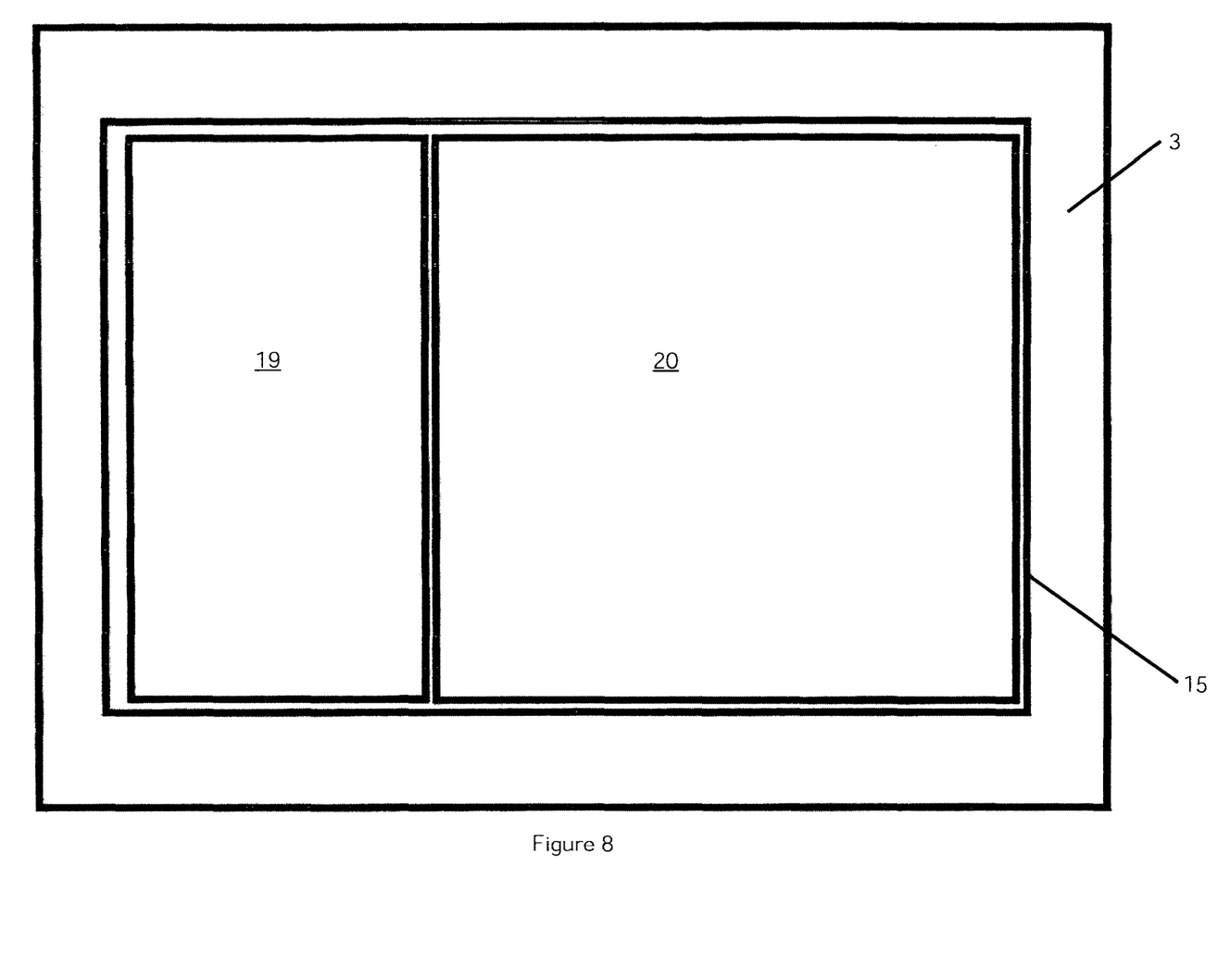
FIG. 8 shows the display screen of the HMI of FIG. 6 in a third configuration.

Accordingly the distraction level determination module 7 will output a value to the processor 5, the processor 5 will determine based on a comparison with the reference table stored in the memory 6 that the value has passed the second predetermined threshold of 100 kph, at which the low distraction selectable areas 21 should no longer react to being selected and should also be removed from the structured display on the display screen 3 and again, in accordance with the graph shown in FIG. 10, as speed increases above 100 kph, the image signal will be output in order to dynamically remove the low distraction selectable areas 21 from the screen 3, by gradually moving them off the screen as speed increases and fading them away, such that once the speed reaches 200 kph the display screen 3 shows the image shown in FIG. 8, in which none of the selectable items are visible.

Figure 9:
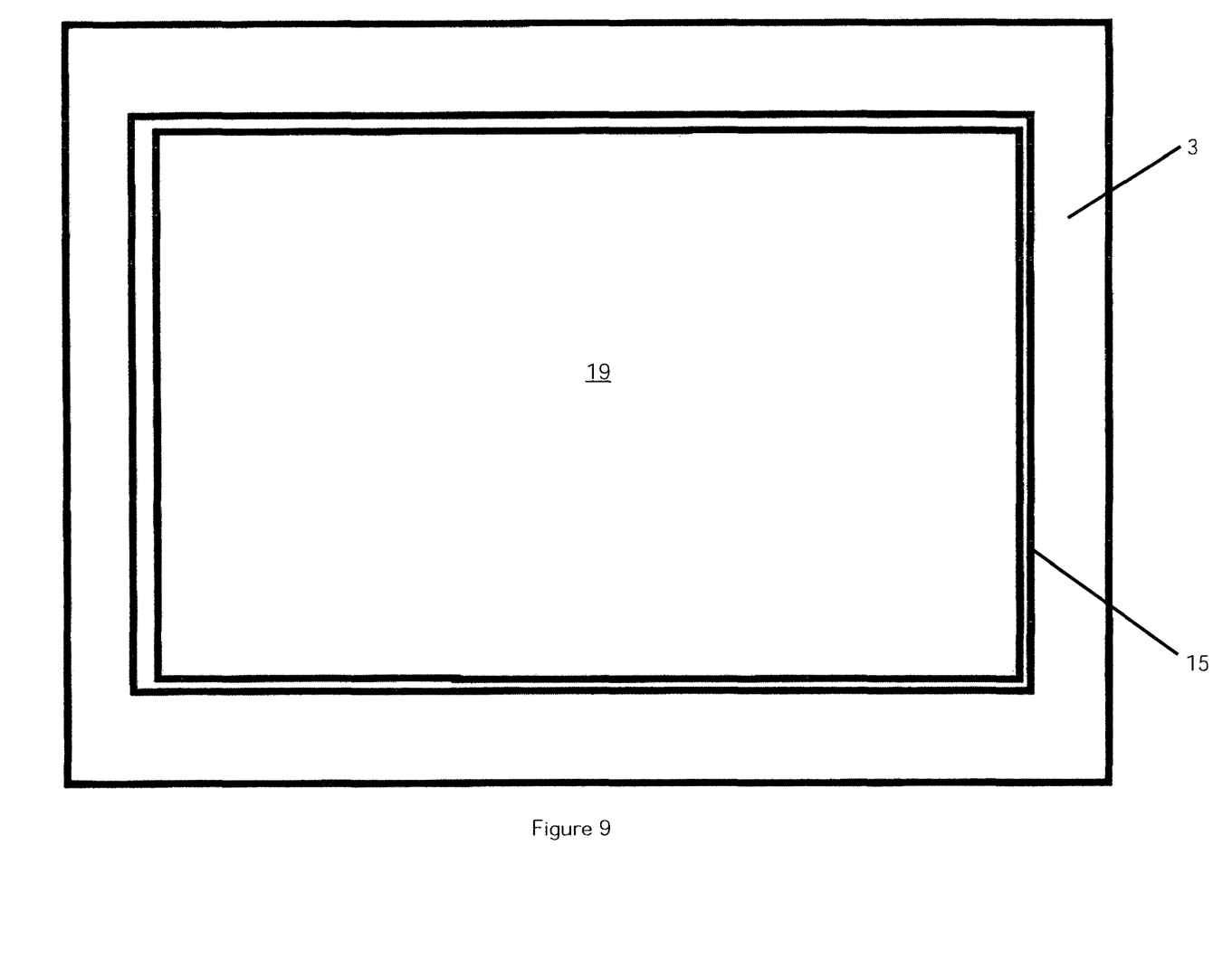
FIG. 9 shows the display screen of the HMI of FIG. 6 in a fourth configuration.

In a further step, if the continuous monitoring of the signal that determines the distraction level (i.e. speed) continues to increase and the value passes a third threshold of 200 kph, to enter a third region stored in the memory of between 200 and 500 kph, the processor 5 sends a signal to the display screen 3 modifying the image to remove the map image 20 and expand the navigation information image 19 to occupy substantially the entire visible area on the display screen 3 as shown in FIG. 9. Once again, the map image is removed responsively to the speed, being gradually moved off the visible area of the screen and faded away as speed increases above 200 kph, until at 250 kph it is completely invisible. At this stage, the processor may send additional signals to the control unit 14 or ECU 12 to shut down any further potential distractions.

The above embodiments are described by way of example only. Many variations are possible without departing from the scope of the invention as defined in the appended claims.

The invention claimed is:

1. An automobile comprising a human machine interface, the human machine interface comprising at least one display screen configured to simultaneously display a plurality of areas as a structured display; the human machine interface operable to determine a driver distraction level based on at least one signal received by the human machine interface and to remove predetermined areas from the plurality of areas of the structured display on the screen in response to an increase in the driver distraction level beyond a predetermined threshold; wherein the human machine interface is operable to remove areas from the structured display dynamically, such that predetermined areas gradually recede from the screen, appear to move off the edge of the plurality of areas of the structured display, or become covered by other areas of the screen.

2. The automobile comprising a human machine interface according to claim 1 which is operable to increase the plurality of areas remaining on the structured display as predetermined areas are removed and/or wherein one or more of the plurality of areas are selectable areas and selectable areas are removed from the screen.

3. The automobile comprising a human machine interface according to claim 1 wherein at least one of the plurality of areas comprises an image of a navigation instruction and wherein the human machine interface is configured to increase a size of the area comprising the navigation instruction on the structured display in response to an increase in the driver distraction level beyond the predetermined threshold.

4. The automobile comprising a human machine interface according to claim 1 wherein the driver distraction level is determined based on a speed of travel of the vehicle.

5. The automobile comprising a human machine interface according to claim 1 wherein the driver distraction level is calculated based on signals indicative of one or more of the following factors, each factor optionally being weighted: speed, driver drowsiness, road condition, traffic conditions, navigation data, upcoming manoeuvres, status of Autonomous Cruise Control (ACC), status of Automatic Emergency Braking system (AEB), status of automatic Lane Keeping System (LKS), and/or Lane Departure Warning system (LDW), status of a Traffic Pilot, or Auto Pilot, telephone status, radio/video status and/or volume, and/or based on the state of driving controls.

6. The automobile comprising a human machine interface according to claim 5 in which driver distraction level is calculated based on the state of driving controls and each factor is weighted, and which is operable such that when it is determined that a gear lever is in neutral and/or a hand brake is activated, the driver distraction level is set to zero regardless of other factors.

7. The automobile comprising a human machine interface according to claim 1 which is operable to receive a signal indicative of road condition from sensors on a vehicle, and to calculate the driver distraction level based on a road condition value obtained from the sensors.

8. The automobile comprising a human machine interface according to claim 1 which is operable to receive a signal comprising navigation data and/or upcoming manoeuvres from a satellite navigation system and to calculate the driver distraction level based on a value indicative of the difficulty and/or proximity of one or more upcoming manoeuvres.

9. The automobile comprising a human machine interface according to claim 1 which is operable to receive a signal indicating the status of one or more safety systems from the vehicle's central computer, or Engine Control Unit (ECU) and to calculate the driver distraction level based on a value associated with the status of the one or more safety systems.

10. The automobile comprising a human machine interface according to claim 5 which is operable to calculate the driver distraction level by assigning a value based on the level of one or more of the factors and applying a weighting to the factor.

11. The automobile comprising a human machine interface according to claim 1 wherein the human machine interface dynamically removes areas from the screen in response to an increase in the driver distraction level; wherein the signal indicative of the driver distraction level is indicative of the speed of the vehicle and a distance until a next navigation manoeuvre; the display screen being configured to simultaneously display an area comprising an image of navigation instructions, an area comprising an image of a map and one or more selectable areas, wherein the human machine interface is operable such that as speed increases and as the distance until the next manoeuvre decreases past a first predetermined threshold, the display screen is operable to remove one or more selectable areas from the structured display on the screen, then as a second predetermined threshold is passed, the human machine interface is operable to increase the size of the area comprising navigation instructions, then, as a third predetermined threshold is passed, the human machine interface is operable to remove the area comprising the image of the map from the screen such that only the image comprising a navigation instruction remains and its size is significantly increased.

12. The automobile comprising a human machine interface according to claim 11 which is operable to only remove the area comprising an image of the map from the structured display when it is determined that the automobile is traveling above a certain predetermined threshold speed and within a certain predetermined distance of the next navigation manoeuvre.

13. The automobile comprising a human machine interface according to claim 1 wherein the areas recede from the screen by fading away, and moving off the visible area of the screen.

14. The automobile comprising a human machine interface according to claim 1 wherein as speed, or driver distraction level, gradually increases, so predetermined areas gradually recede from the screen.

15. The automobile comprising a human machine interface according to claim 14 wherein the predetermined areas include first selectable areas which gradually recede from the screen and at a certain predetermined speed, or at a certain predetermined driver distraction level, are no longer selectable.

16. The automobile comprising a human machine interface according to claim 15 wherein once certain first predetermined selectable areas have receded and are no longer selectable, as speed, or driver distraction level increases, so second predetermined areas recede, and when the speed or driver distraction level reaches a second predetermined speed, the second predetermined areas are no longer selectable either.

17. The automobile comprising a human machine interface according to claim 16 wherein once the second predetermined selectable areas are no longer selectable, one or more third predetermined area recedes, until at a certain predetermined speed or a certain predetermined driver distraction level, only a predetermined minimum level of information is provided on the screen.

18. The automobile comprising a human machine interface according to claim 14 wherein the extent to which the areas recede is directly proportional to the speed of the vehicle, and/or wherein the areas return to the screen as speed, or driver distraction level, reduces, gradually appearing, and optionally becoming selectable at the same predetermined threshold speed, or driver distraction level, at which they stopped being selectable.

19. The automobile comprising a human machine interface according to claim 15 wherein the selectable areas gradually move off the visible area of the screen and begin to fade at the moment that they are no longer selectable; or gradually fade and begin to move of the screen at the point that they are no longer selectable.

20. A method of controlling a human machine interface in the automobile according to claim 1, the method comprising:
  a. receiving at least one signal relating to a factor relevant to the amount of concentration required of a driver;
  b. calculating the driver distraction level based on the at least one signal;
  c. determining whether the driver distraction level is above a predetermined threshold; and d. if the driver distraction level is determined to exceed a predetermined threshold, controlling the display screen so as to dynamically remove predetermined areas from the structured display on the display screen.

21. A human machine interface for a vehicle, the human machine interface comprising at least one display screen configured to simultaneously display a plurality of areas as a structured display; the human machine interface operable to determine a driver distraction level based on at least one signal received by the human machine interface and to remove predetermined areas from the plurality of areas of the structured display on the screen in response to an increase in the driver distraction level beyond a predetermined threshold; wherein the human machine interface is operable to remove areas from the structured display dynamically, such that predetermined areas gradually recede from the screen, appear to move off the edge of the plurality of areas of the structured display, or become covered by other areas of the screen.

* * * * *